(12) United States Patent
Kuroki et al.

(10) Patent No.: US 7,469,731 B2
(45) Date of Patent: Dec. 30, 2008

(54) HEAVY-DUTY TIRE HAVING GROUND-CONTACT SURFACE SHAPE

(75) Inventors: Takeshi Kuroki, Kobe (JP); Minoru Nishi, Kobe (JP); Takahiro Kimishima, Kobe (JP); Satoshi Tsuda, Kobe (JP); Jyunji Ohira, Kobe (JP); Mitsuharu Koya, Kobe (JP); Masakazu Washizuka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 13 days.

(21) Appl. No.: 10/495,363

(22) PCT Filed: Dec. 16, 2002

(86) PCT No.: PCT/JP02/13155

§ 371 (c)(1),
(2), (4) Date: May 12, 2004

(87) PCT Pub. No.: WO03/053722

PCT Pub. Date: Jul. 3, 2003

(65) Prior Publication Data

US 2005/0016656 A1    Jan. 27, 2005

(30) Foreign Application Priority Data

Dec. 21, 2001 (JP) ............................. 2001-390013
Jan. 22, 2002 (JP) ............................. 2002-013237
May 30, 2002 (JP) ............................. 2002-157877

(51) Int. Cl.
*B60C 11/00* (2006.01)

(52) U.S. Cl. ............................. 152/209.1; 152/209.14; 152/209.18; 152/538

(58) Field of Classification Search ............ 152/209.14, 152/454, 526, 538, 209.1, 209.18
See application file for complete search history.

(56) References Cited

U.S. PATENT DOCUMENTS 5,131,446 A  *  7/1992  Fukumoto et al. ........... 152/454
5,394,915 A     3/1995  Takada (Continued)

FOREIGN PATENT DOCUMENTS

| EP | 878329 A1 | 11/1998 |
| JP | 02-155805 | * 6/1990 |
| JP | 5-77608 A | 3/1993 |
| JP | 11-245622 A | 9/1999 |

(Continued)

*Primary Examiner*—Steven D Maki
(74) *Attorney, Agent, or Firm*—Birch, Stewart, Kolasch & Birch, LLP

(57) ABSTRACT

In a ground-contact surface shape of a tire, when a tangent angle formed between an axial direction of the tire and a tangent X at each point P on a profile line of the tire is defined as θ, a tangent angle θ1 in a ground-contact end point Pd is 25° or smaller. When a minimum value of the tangent angle θ in a region Y which is separated away from a tire equator C by a distance in a range of not less than 0.4 times but not more than 0.7 times a half of the ground-contact width of the tread is defined as θ2, and a tangent angle at a 0.9 times point Pq which is separated away from the tire equator C by a distance of 0.9 times the half of the ground-contact width of the tread is defined as θ3, a difference (θ3−θ2) is set in a range of not less than −10° but not more than +10°.

7 Claims, 13 Drawing Sheets

U.S. PATENT DOCUMENTS

| | | | |
|---|---|---|---|
| 5,647,925 A | | 7/1997 | Sumiya et al. |
| 5,660,652 A | * | 8/1997 | Young et al. ........... 152/209.14 |
| 6,880,599 B2 | * | 4/2005 | Maruoka et al. ............. 152/454 |
| 2002/0124928 A1 | * | 9/2002 | Carra et al. .................. 152/523 |
| 2004/0112492 A1 | * | 6/2004 | Kotanides, Jr. ........... 152/209.1 |
| 2005/0000613 A1 | * | 1/2005 | Maruoka et al. ......... 152/209.1 |

FOREIGN PATENT DOCUMENTS

| | | | |
|---|---|---|---|
| WO | WO 97/07996 A1 | | 3/1997 |
| WO | WO 98/58810 | * | 12/1998 |
| WO | WO 00/56559 | * | 9/2000 |

* cited by examiner

PRIOR ART

HEAVY-DUTY TIRE HAVING GROUND-CONTACT SURFACE SHAPE

TECHNICAL FIELD

The present invention relates to a heavy duty tire which is capable of suppressing uneven wear such as unbalanced wear in the vicinity of a tread ground-contact edge and orbital wear along a shoulder groove by specifying a ground-contact surface shape, and capable of equalizing wear.

BACKGROUND TECHNIQUE

In the case of a heavy duty tire for example, in generally, its tread profile shape (a) is formed into a single arc shape in a vulcanization die as schematically shown in FIG. 13.

In a normal internal pressure state in which such a tire is mounted on a regular rim and a normal internal pressure is charged into the tire, however, there is a tendency that a tread surface swells radially outward in a region Y separated from a tire equator by a distance which is 0.4 to 0.7 times a half of a ground-contact width of the tread. Therefore, a circumferential length difference between the swelling portion (b) and the tread ground-contact edge (e) becomes great, a slip is generated between the tread surface on the tread ground-contact edge side and a road surface, and uneven wear such as so-called unbalanced wear is prone to be generated.

To suppress the unbalanced wear, Japanese Patent Application Laid-open No.H7-164823 and the like propose a technique. In this technique, the tread profile shape is formed into a double radius shape in which a portion of the tire on the tread ground-contact edge side is of arc having a radius of curvature greater than that on the tire equator side, so that the tread profile shape in the normal internal pressure becomes closer to a single arc shape, thereby suppressing the unbalanced wear.

According to this technique, however, there is a problem that although the unbalanced wear is suppressed to a certain degree, new uneven wear is generated in the region Y. Especially when a shoulder groove is disposed in the region Y, there is a tendency that so-called orbital wear which is caused on a groove side edge of the shoulder groove appears seriously, and a satisfactory result for equalizing the wear can not be obtained.

The present invention has been accomplished in view of such problems, and it is an object of the invention to provide a heavy duty tire capable of suppressing uneven wear such as unbalanced wear and orbital wear and capable of achieving a high level of equalization of the wear based on an idea that a profile line of the ground-contact surface shape is limited.

DISCLOSURE OF THE INVENTION

To achieve the above object, the present invention provides a heavy duty tire comprising a carcass extending from a tread portion to a bead core of a bead portion through a sidewall portion, and a belt layer disposed inside the tread portion and outside the carcass, the tread portion having two or more longitudinal main grooves extending continuously in a circumferential direction of the tire, and a shoulder groove of the longitudinal main grooves disposed outermost side in an axial direction of the tire has a groove center line passing through a region Y which is separated away from a tire equator by a distance in a range of not less than 0.4 times but not more than 0.7 times a half of the ground-contact width of the tread, wherein the profile line of the ground-contact surface shape when a normal load is applied to a tire in a regular internal pressure state in which the tire is mounted on the regular rim and a regular internal pressure is charged into the tire is limited as follows.

That is, according to a heavy duty tire of a first invention, a tangent X on each point on the profile line is inclined toward a ground-contact length center radially outward of the tire, when a tangent angle of the tangent X with respect to the axial direction of the tire is defined as $\theta$, a tangent angle $\theta 1$ in a ground-contact edge point Pd on a tread ground-contact edge is set to 25° or smaller, and a difference ($\theta 3 - \theta 2$) between a minimum value $\theta 2$ of the tangent angle $\theta$ in the region Y and the tangent angle $\theta 3$ at a 0.9 times point Pq which is away from the tire equator by a distance of 0.9 times the half of the ground-contact width of the tread is set in a range of not less than −10° but not more than +10°.

According to a heavy duty tire of a second invention, in the profile line, an angle $\alpha$ formed between the axial direction of the tire and a straight line J1 which passes through an equator point Pa on the tire equator and a groove-side edge point Pb on the tire equator side of the shoulder groove is set in a range of more than 0° but not more than 12°, and an angle $\beta$ formed by the axial direction of the tire and a straight line J2 which passes through a groove-side edge point Pc on the tread ground-contact edge side of the shoulder groove and a ground-contact end point Pd on a tread ground-contact edge is set in a range of not less than −3° but not more than the angle $\alpha$.

According to a heavy duty tire of a third invention, in the profile line, an angle $\alpha$ formed between the axial direction of the tire and a straight line J1 which passes through an equator point Pa on the tire equator and a groove-side edge point Pb on the tire equator side of the shoulder groove is set in a range of more than 0° but not more than 15°, an angle $\beta$ formed by the axial direction of the tire and a straight line J2 which passes through a groove-side edge point Pc on the tread ground-contact edge side of the shoulder groove and a ground-contact edge point Pd on a tread ground-contact edge is set in a range of not less than −5° but not more than the angle $\alpha$, and an angle $\gamma$ formed between the axial direction of the tire and a straight line J3 which passes through the equator point Pa and the ground-contact edge point Pd is set in a range of more than 0° but not more than 12° and not less than the angle $\beta$.

In this specification, the "regular rim" is a rim determined for each tire according to a standard on which the tire is based among standards for tires, and for example, in JATMA, when a narrower rim width than the standard rim is set, the regular rim for the tire is a "rim having a rim width which is narrower than the standard rim by one rank", and when no narrower rim width than the standard rim is set, the regular rim for the tire is a "standard rim", in TRA, when a narrower rim width than the "Design Rim" is set, the regular rim for the tire is a "rim having narrower width than the "Design Rim" by one rank", and when no narrower rim width than the "Design Rim" is set, the regular rim for the tire is the "Design Rim", and in ETRTO, when a rim width narrower than a "Measuring Rim" is set, the regular rim for the tire is a "rim having narrower width than the "Measuring Rim" by one rank", and when no narrower rim than the "Measuring Rim" is set, the regular rim for the tire is the "Measuring Rim".

Further, the "regular internal pressure" means an air pressure determined for each tire according to a standard on which the tire of the present invention is based among standards for tires. The regular internal pressure means a maximum air pressure in the case of JATMA, the regular internal pressure means a maximum value described in "TIRE LOAD LIMITS AT VARIOUS COLD INFLATION PRESSURES" in the case of TRA, and the regular internal pressure means a "INFLATION PRESSURE" in the case of ETRTO, but when the tire is for a passenger vehicle, the normal internal pressure is 180 kPa. The "normal load" means a load determined for each tire according to a standard on which the tire of the present invention is based among standards for tires. The normal load is a maximum load capacity in the case of the JATMA, and the normal load means a maximum value described in the Table "TIRE LOAD LIMITS AT VARIOUS COLD INFLATION PRESSURES" in the case of TRA and the normal load means "LOAD CAPACITY" in the case of ETRTO.

In this specification, the "half of the ground-contact width of the tread" means a distance between the tire equator and an outer end in the tire axial direction of the tread ground-contact surface which contacts with ground when the normal load is applied to the tire in a state in which the tire is mounted on the regular rim and the normal internal pressure is charged into the tire.

In this specification, the tangent angle $\theta$, the angles $\alpha$, $\beta$ and $\gamma$ are defined such that directions of a tangent X and straight lines J1, J2 and J3 inclining toward axially outward of the tire toward a center of a ground-contact length, i.e., directions thereof inclining toward a side in which the ground-contact length is reduced is positive (+).

BEST MODE FOR CARRYING OUT THE INVENTION

Embodiments of the present invention will be explained below together with illustrated examples.

Figure 1:
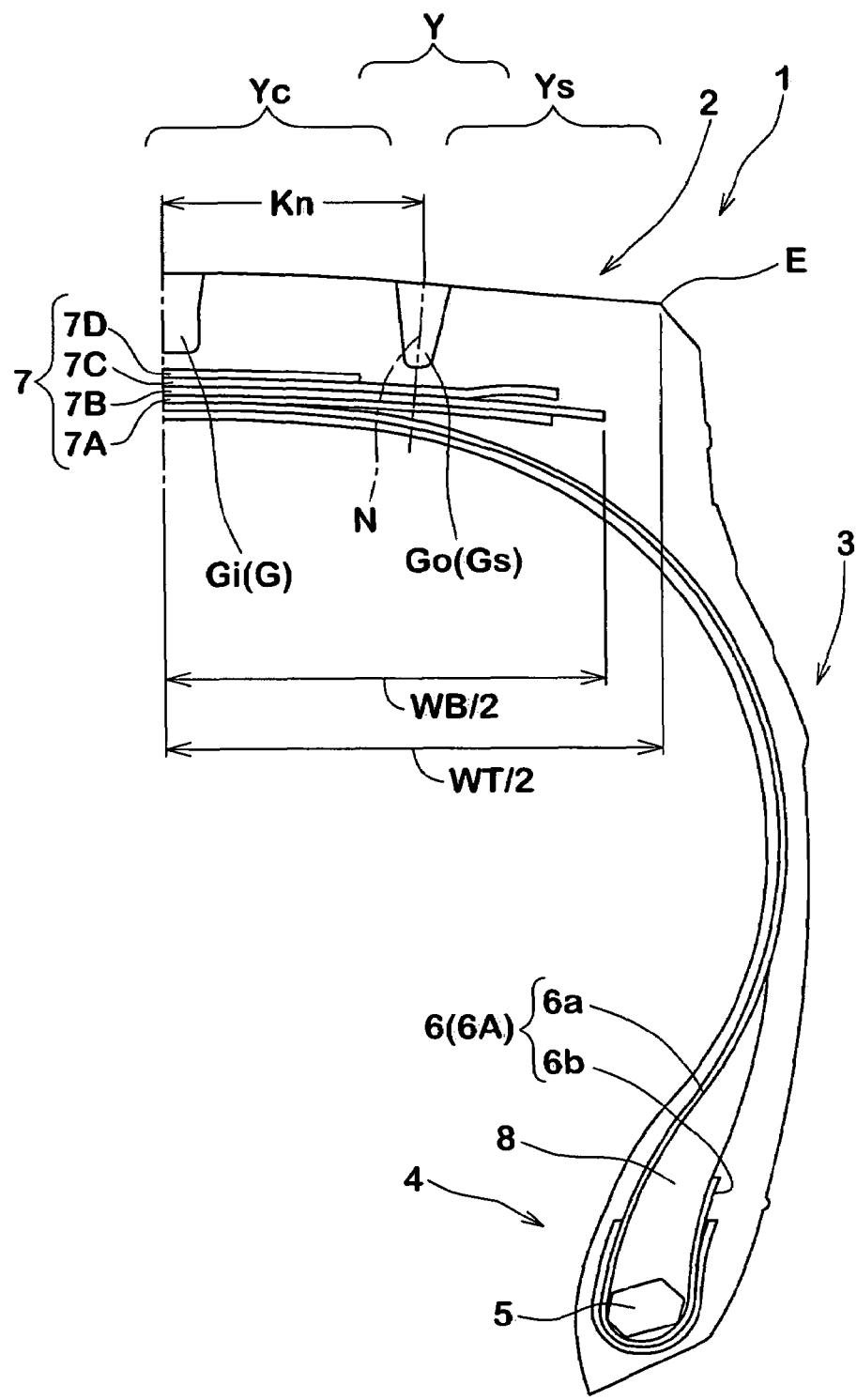
FIG. 1 is a sectional view of a tire of an embodiment of the present invention.

FIG. 1 is a sectional view of a heavy duty tire of the present invention for a truck, a bus and the like.

In FIG. 1, a heavy duty tire 1 comprises a carcass 6 extending from a tread portion 2 to a bead core 5 of a bead portion 4 through a sidewall portion 3, and a belt layer 7 disposed inside the tread portion 2 and outside the carcass 6.

The carcass 6 comprises one or more (one, in this example) carcass ply 6A in which a carcass cord is arranged at an angle of 70 to 90° with respect to a circumferential direction of the tire. A metal cord such as steel is used as the carcass cord.

The carcass ply 6A has a ply body 6a extending between the bead cores 5 and 5. The ply body 6a is provided at its opposite sides with turned up portions 6b which are turned up from inner side toward outer side around the bead core 5. A bead apex rubber 8 extending radially outward from the bead core 5 is disposed between the ply body 6a and the turned up portion 6b. The bead apex rubber 8 reinforces a portion of the tire from the bead portion 4 to the sidewall portion 3.

The belt layer 7 comprises three or more belt plies using metal cords as belt cords. In this example, the belt layer 7 comprises four belt plies, i.e., a first belt ply 7A in which a steel cord is arranged radially innermost side at an angle of 60±15° with respect to the circumferential direction of the tire, and second to fourth belt plies 7B, 7C and 7D in which steel cords are arranged at an angle of 10 to 35° with respect to the circumferential direction of the tire.

In the belt layer 7, a ply width of the first belt ply 7A in the axial direction of the tire is smaller than a ply width of the second belt ply 7B and is substantially equal to a ply width of the third belt ply 7C. A ply width WB of the second belt ply 7B which is the greatest width is 0.80 to 0.95 times a tread ground-contact width WT, thereby reinforcing substantially the entire width of the tread portion 2 while providing a hoop effect and enhancing the rigidity of the tread. The fourth belt ply 7D having the narrowest width functions as a breaker which protects the first to third belt plies 7A to 7D and the carcass 6 from damage.

Next, the heavy duty tire 1 is provided at its tread portion 2 with a tread pattern having two or more longitudinal main grooves G continuously extending in the circumferential direction. The longitudinal main groove G is a groove having a groove width of 3 mm or more. The longitudinal main groove G is straight or zigzag in shape (including wavy shape) and extends in the circumferential direction. It is preferable that the groove width is 5 mm or more, and more preferably in a range of 7 to 10 mm. It is preferable that a groove depth is 9 mm or more, and more preferably in a range of 14.5 to 17.5 mm.

In this example, each the longitudinal main groove G comprises three grooves, i.e., an inner longitudinal main groove Gi disposed on the tire equator C, and outer longitudinal main grooves Go disposed on each side of the longitudinal main groove Gi. The outer longitudinal main groove Go constitutes axially outermost side shoulder groove Gs of the tire.

A groove center line N of the shoulder groove Gs passes through the region Y which is separated from the tire equator C by a distance of 0.4 to 0.7 times a half of the ground-contact width of the tread WT/2. That is, a distance Kn of the groove center line N from the tire equator C is in a range of 0.4 to 0.7 times the half of the ground-contact width of the tread WT/2. With this design, the tread portion 2 is divided into a tread center portion Yc which is inside the shoulder groove Gs and a tread shoulder portion Ys which is outside the shoulder groove Gs. When the shoulder groove Gs is a zigzag groove, a center of amplitude of the zigzag is the groove center line N. It is preferable that the region Y is in a range of 0.5 to 0.7 times the half of the ground-contact width of the tread WT/2, and more preferably 0.5 to 0.65 times the half of the ground-contact width of the tread WT/2.

In this invention, in order to suppress uneven wear of the tire 1 such as unbalanced wear and orbital wear, and to equalize the wear, in a normal internal pressure state in which the tire 1 is mounted on the regular rim and a normal internal pressure is charged into the tire, a ground-contact surface shape 10 when a normal load is applied is limited as follows.

Figure 3:
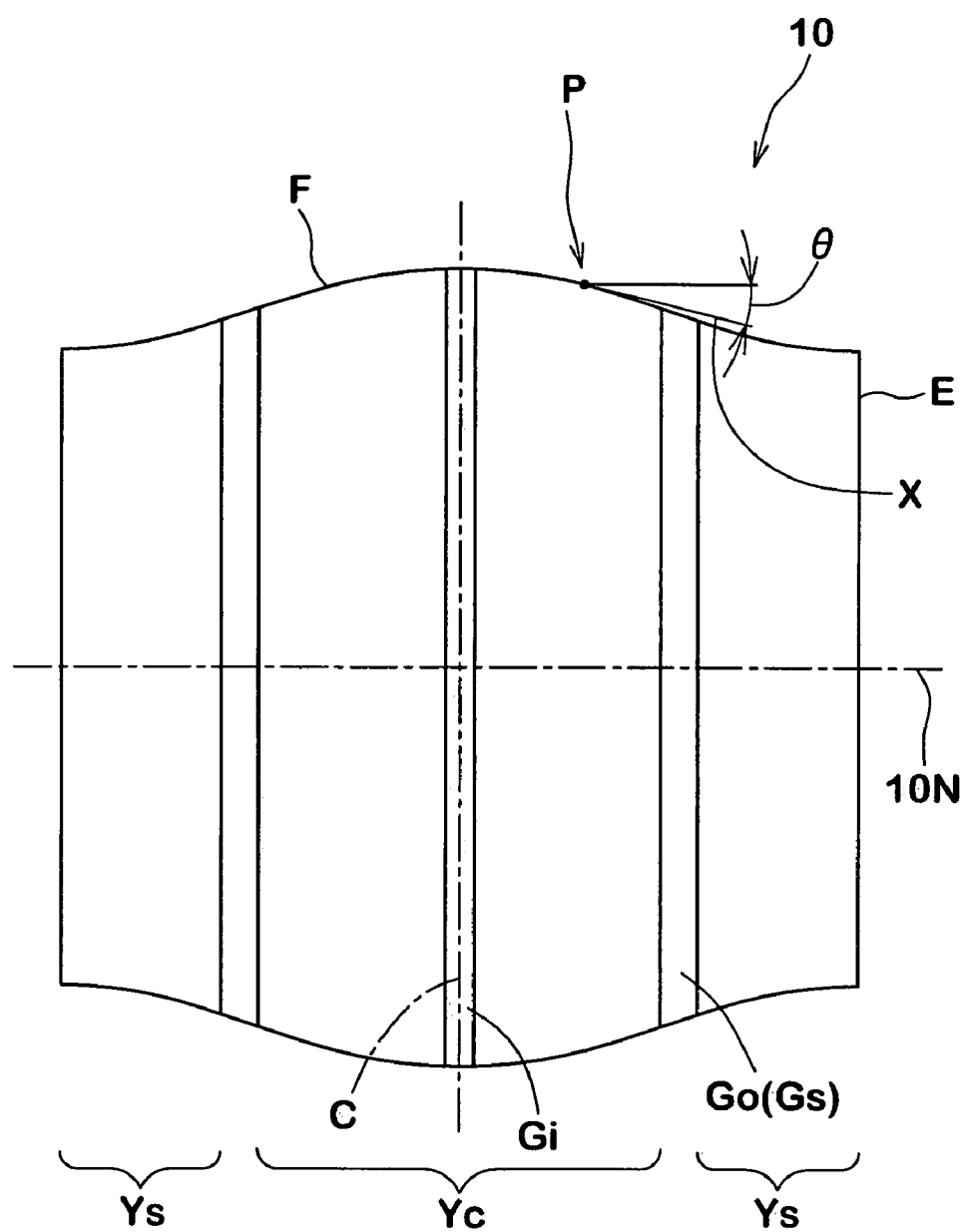
FIG. 3 is a schematic view of a ground-contact surface shape of the tire.
Figure 4:
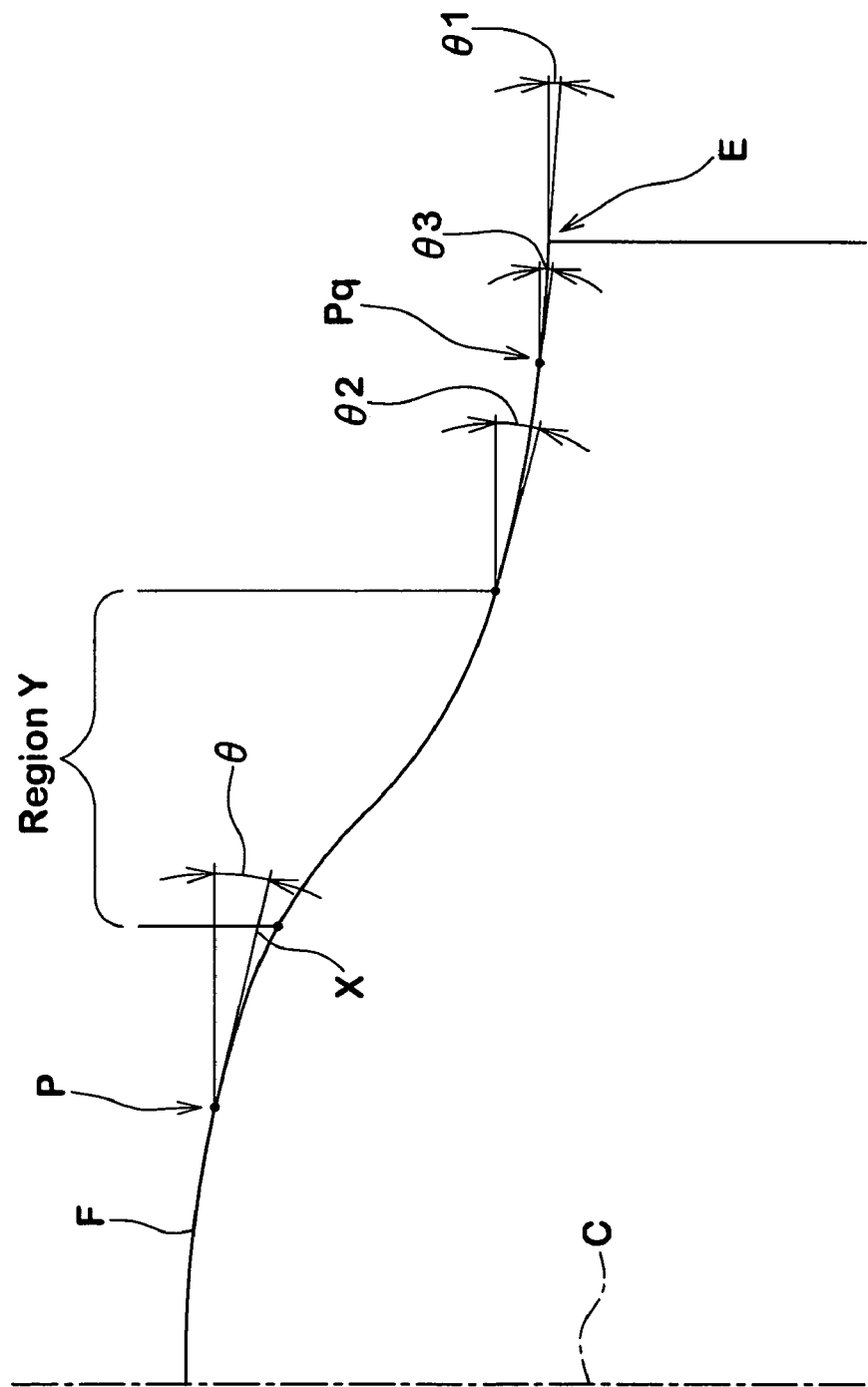
FIG. 4 is a diagram exaggeratedly showing a profile line of the ground-contact surface shape thereof.

That is, according to a tire of a first invention, as shown in FIGS. 3 and 4, in the ground-contact surface shape 10, when an angle (tangent angle) formed between an axial direction of the tire and a tangent X of each point P on a profile line F is defined as θ, 1) a tangent angle θ1 in a ground-contact edge point Pd on a tread ground-contact end E is set to 25° or less; and 2) a difference (θ3−θ2) between a tangent angle θ3 at a 0.9 times point Pg separated from the tire equator C by a distance of 0.9 times the half of the ground-contact width of the tread WT/2 is set in a range of not less than −10° but not more than +10°.

At that time, in the entire range from the tire equator C to the tread ground-contact end E, the tangent X is inclined to a ground-contact length center 10N axially outward of the tire, i.e., toward+side.

Here, the tangent angle θ is a new parameter devised by the present inventor, and it was found that the tangent angle θ has a strong correlation with respect to the uneven wear, and the uneven wear is generated in a portion of the tire having a large tangent angle θ. It is important for enhancing uneven wear resistance to limit the tangent angle θ.

That is, when the tangent angle θ1 in the ground-contact edge point Pd is reduced to 25° or less, the ground-contact length at the ground-contact edge point Pd can be increased and thus, it is possible to suppress the unbalanced wear.

When the difference (θ3−θ2) of the tangent angle is limited to a range of −10° or more to +10° or less, it is possible to equalize the proceeding of wear over the entire tread, and it is possible to suppress the unbalanced wear and the uneven wear such as orbital wear at the shoulder groove Gs, and to enhance the wear resistance over the entire range from the tire equator C to the tread ground-contact end E.

When the difference (θ3−θ2) exceeds +10°, the ground-contact length at the tread ground-contact end E becomes excessively small, and when the difference (θ3−θ2) is smaller than −10°, the ground-contact length in the region Y becomes excessively long, and punching wear is generated between the tire equator C and the region Y.

Especially in order to equalize the wear, it is preferable that a maximum value θmax of the tangent angle θ in the entire range from the tire equator C to the tread ground-contact end E is suppressed to 25° or less. If the tangent angle θ exceeds 25°, abrupt uneven wear is generated in this exceeding portion. For example, if the exceeding portion is at the ground-contact edge E, unbalanced wear is generated, if the exceeding portion is in the region Y, orbital wear is generated, and if the exceeding portion is in the tread center portion Yc, center wear, punching wear and the like are generated.

Figure 5:
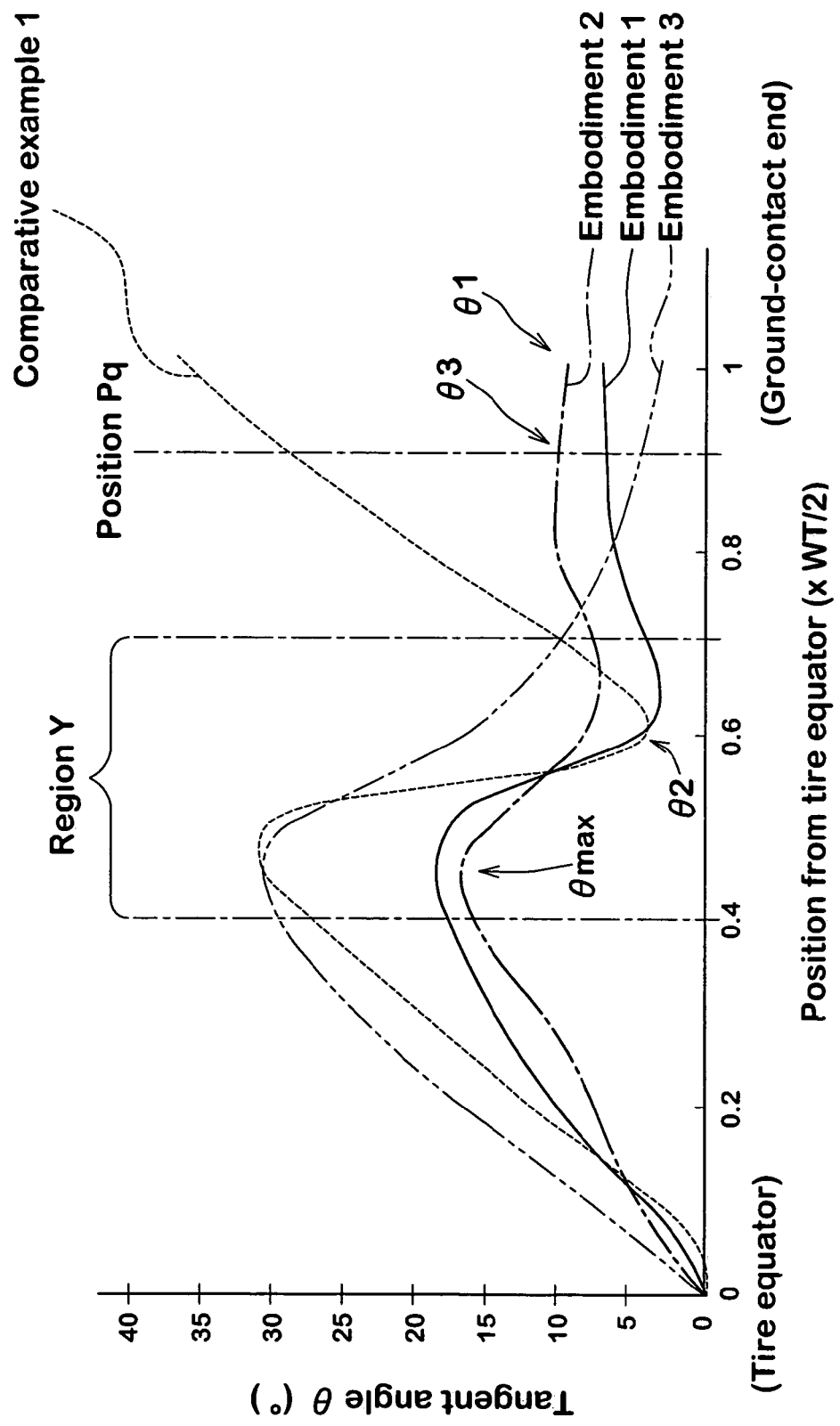
FIG. 5 is a diagram showing a tangent angle $\theta$ of a profile line of the ground-contact surface shape of each tire shown in Table 1.

FIG. 5 shows one example of variation of the tangent angles θ from the tire equator C to the tread ground-contact end E in tires (tire of the first invention) of embodiments A1 to A3 used in a wear test shown in Table 1.

Figure 2:
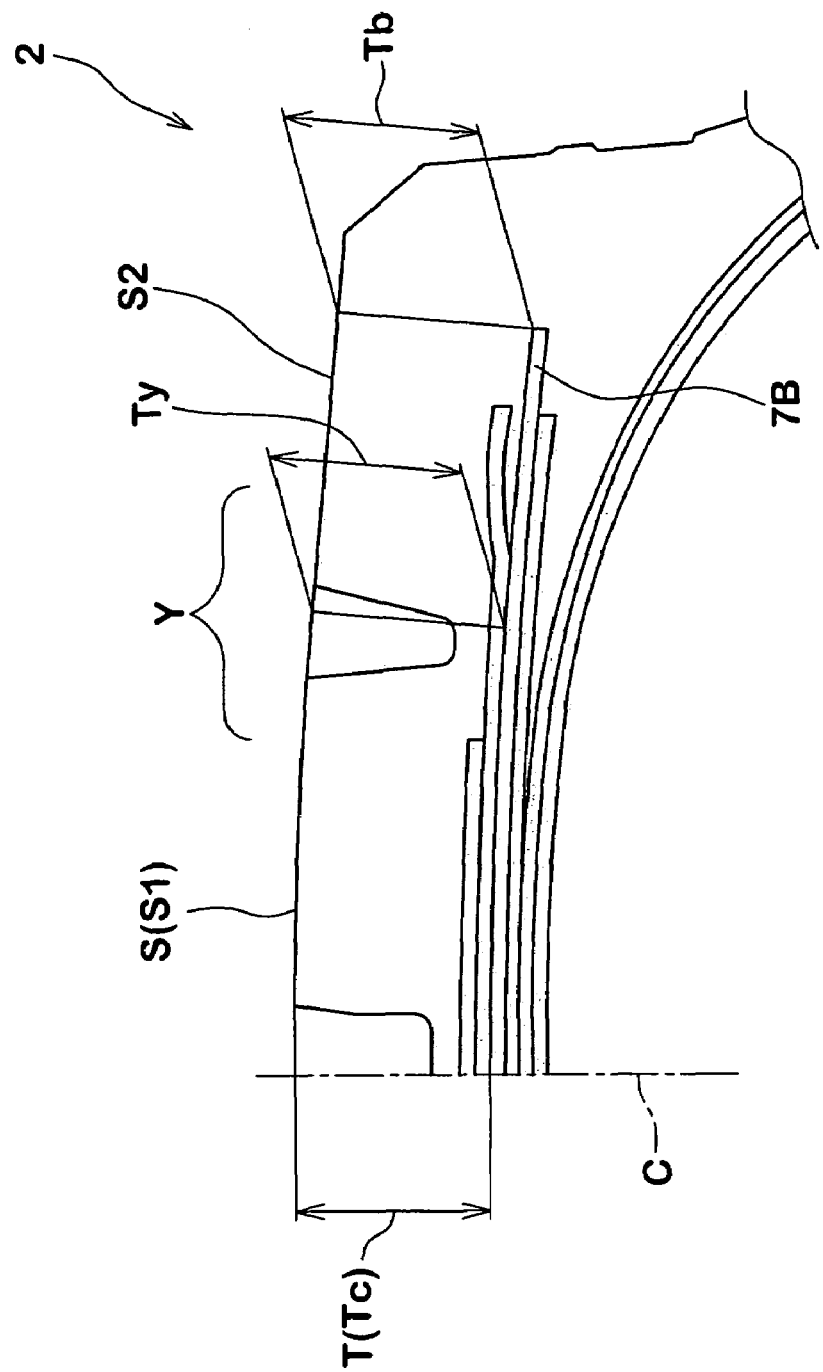
FIG. 2 is an enlarged sectional view of a tread portion of the tire according to a first invention.

Next, in order to obtain the ground-contact surface shape 10 according to the first invention, in this example, as shown in FIG. 2, when a tread thickness between a profile line S of the tread surface ("tread profile line S" hereinafter) and the second belt ply 7B in the normal internal pressure state is defined as T, a tread thickness Ty in each position in the region Y is set in a range of not less than 0.91 times but not more than 1.05 times a tread thickness Tc at the position of the tire equator C, and a tread thickness Tb at a position of an outer end of the second belt ply 7B is set in a range of not less than 0.98 times but not more than 1.03 times the tread thickness Tc.

By employing the distribution of the tread thickness T, it becomes possible to obtain the ground-contact surface shape 10 according to the first invention.

In this example, in order to obtain the distribution of the tread thickness T, the second belt ply 7B is formed of a single arc whose center is on the tire equator C, the tread profile line S in the tread center portion Yc is formed of a projecting arc profile line S1 using a single or a plurality of arcs, and the tread profile line S in the tread shoulder portion Ys is formed of a substantially straight profile line S2.

Next, a heavy duty tire 1 of a second invention will be explained together with FIGS. 6 to 9.

The first invention can suitably be applied to a general heavy duty tire and a tire having three longitudinal main grooves G. The second invention can suitably be applied to a tire for a dump truck used under a high load and a tire having four longitudinal main grooves G.

Figure 6:
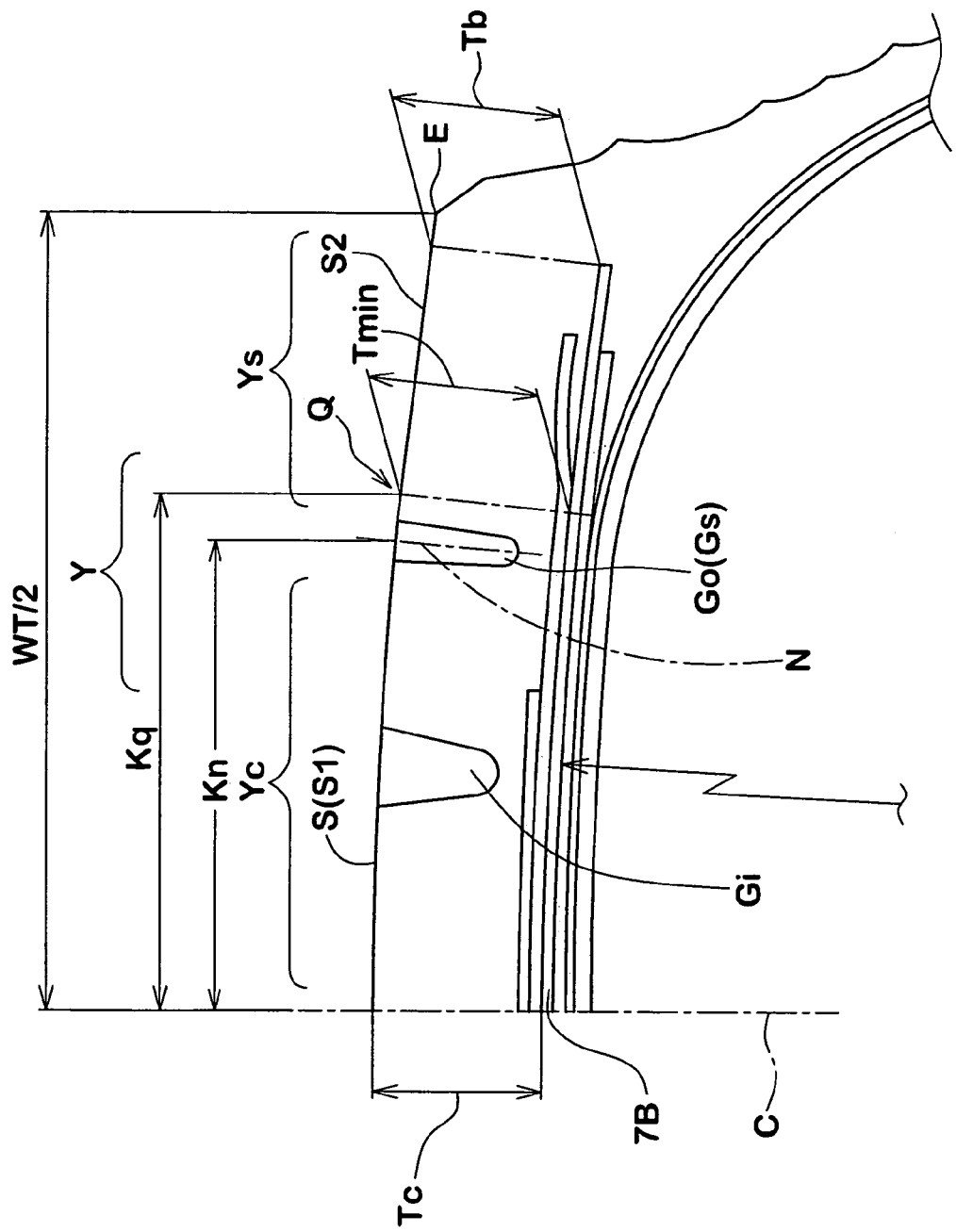
FIG. 6 is a sectional view enlargedly showing a tread portion of a tire according to a second invention.

In this example, as shown in FIG. 6, the heavy duty tire 1 comprises four longitudinal main grooves G, i.e., inner longitudinal main grooves Gi disposed on each side of the tire equator C, and outer longitudinal main grooves Go disposed on the outside of the longitudinal main grooves Gi. A shoulder groove Gs which is the outer longitudinal main groove Go is formed in the region Y.

Figure 7:
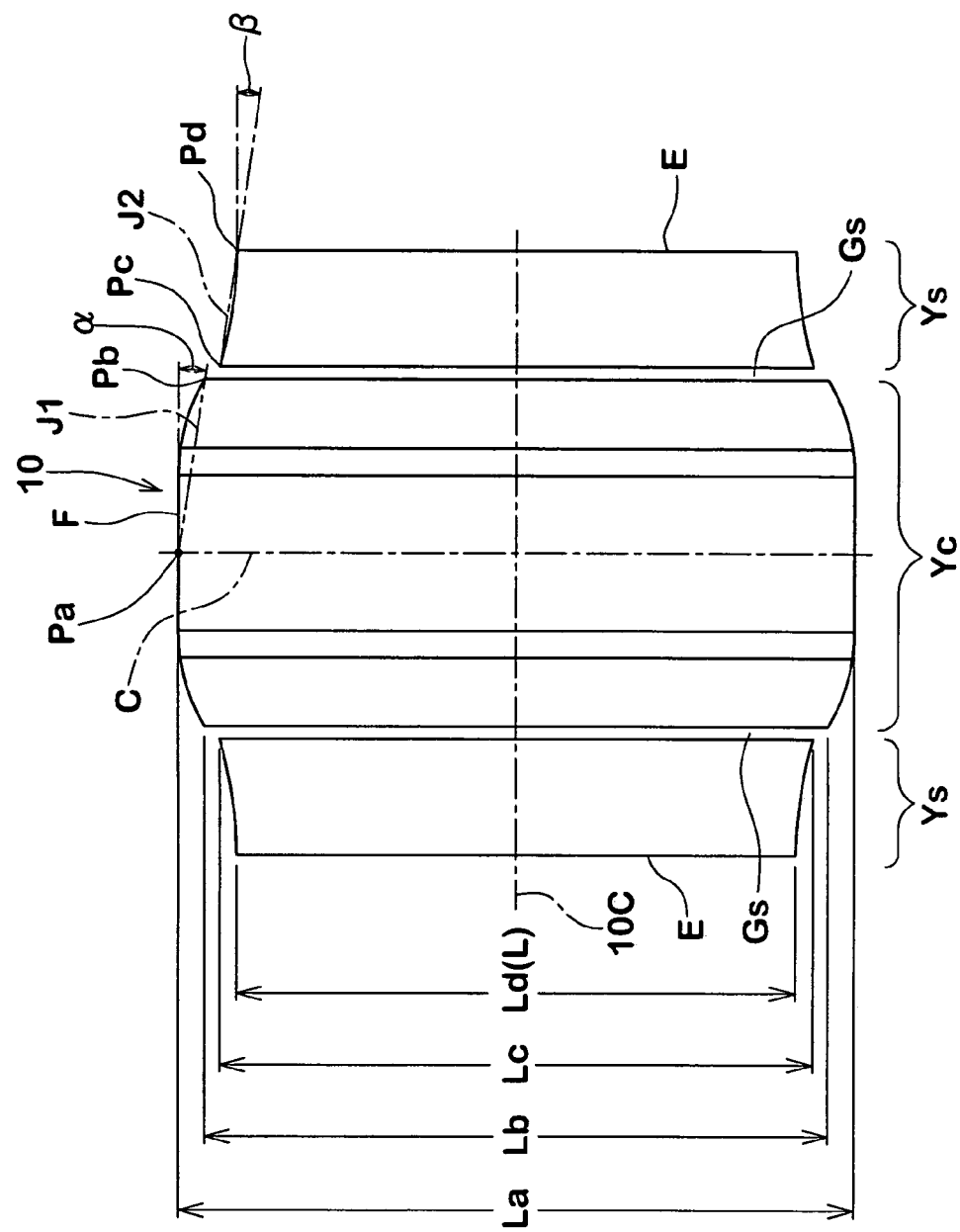
FIG. 7 is a schematic view of a ground-contact surface shape of the tire.
Figure 8:
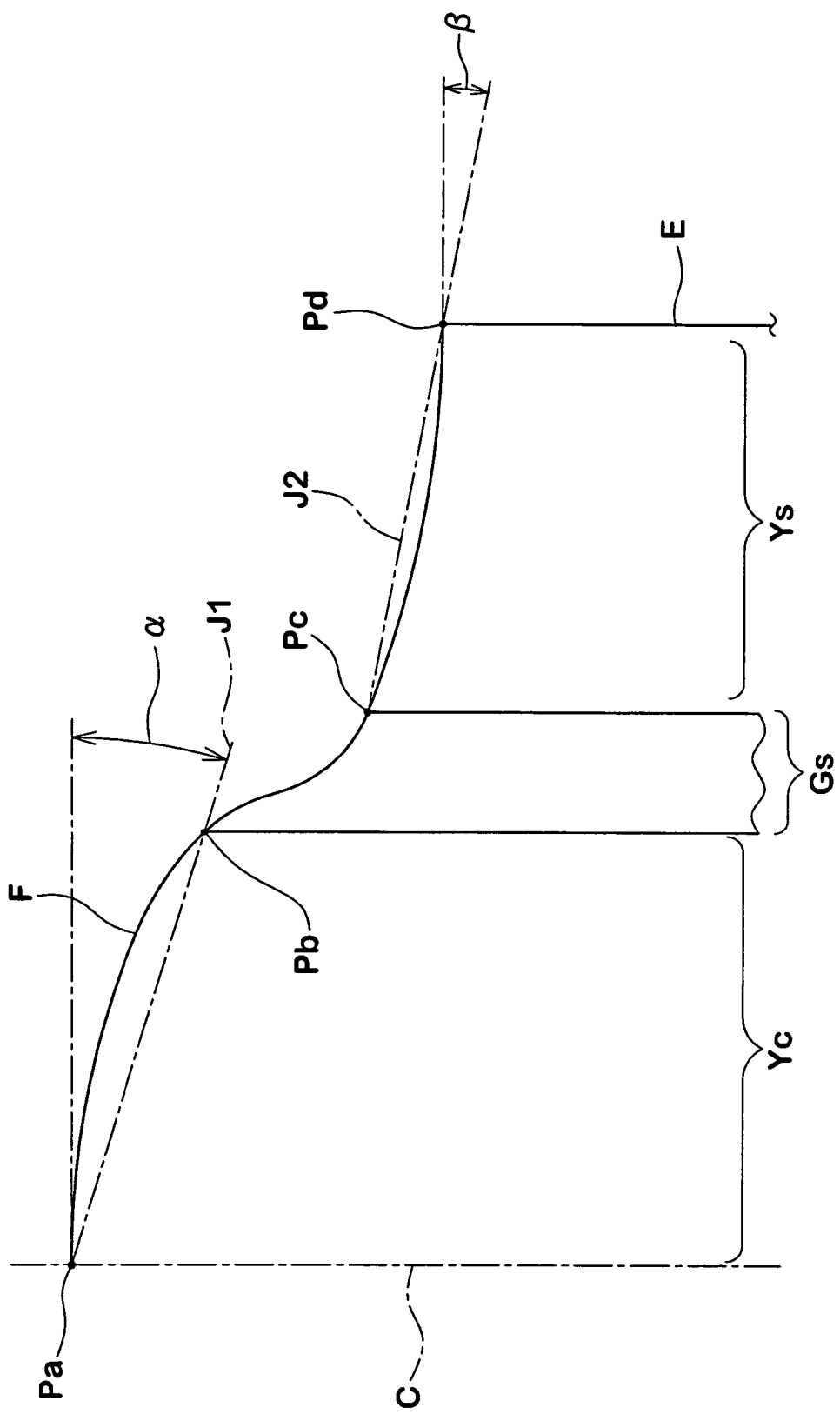
FIG. 8 is a diagram exaggeratedly showing the profile line of the ground-contact surface shape thereof.

In the heavy duty tire 1 of the second invention, in order to suppress the uneven wear and equalize the wear, as shown in FIGS. 7 and 8, in the profile line F of the ground-contact surface shape 10, 3) an angle α formed between the axial direction of the tire and a straight line J1 passing through the equator point Pa and a groove-side edge point Pb on the tire equator C side of the shoulder groove Gs is set in a range of more than 0° but not more than 12°; and 4) an angle β formed between the axial direction of the tire and a straight line J2 passing through a groove-side edge point Pc on the tread ground-contact end E side of the shoulder groove Gs and the ground-contact edge point Pd is set in a range of −3° but not more than the angle α.

Here, the tangent angles α and β are new parameters devised by the present inventor, and these tangent angles are strongly related to the uneven wear, and optimizing the angles α and β is important for enhancing uneven wear resistance (equalizing the wear).

That is, when the angle α exceeds 12°, the ground-contact pressure of the tread shoulder portion Ys is lowered and a load in the tread center portion Yc is excessively increased. Therefore, wear in the tread center portion Yc proceeds faster than the tread shoulder portion Ys, center wear proceeds, and the equalization of wear is deteriorated. When the angle α is not more than 0°, the ground-contact pressure of the tread shoulder portion Ys is increased as compared with the tread center portion Yc. As a result, heat generation in the tread shoulder portion Ys is increased, and there is a tendency that peel-off damage is caused in the belt end by this temperature rise, and durability is deteriorated. Therefore, the angle α is preferably in a range of 5 to 12°.

At that time, if the angle β is limited to a range of not less than −3° but not more than the angle α, slip on the tread ground-contact end E can be reduced, and the unbalanced wear can be suppressed. If the angle β exceeds the angle α, a ground-contact length at the ground-contact edge point Pd becomes excessively short as compared with ground-contact lengths Lb and Lc at the groove-side edge points Pb and Pc of the shoulder groove Gs, and unbalanced wear is prone to be generated. If the angle β is smaller than −3° on the other hand, the ground-contact pressure at the groove-side edge point Pc is lowered, the wear at the groove-side edge point Pc proceeds faster, and orbital wear is generated, or the ground-contact pressure of the entire tread shoulder portion Ys becomes extremely small, and center wear is generated. Therefore, it is preferable that the angle β is not less than 0°.

In order to suppress the unbalanced wear, it is also important to limit a ratio La/Ld between a ground-contact length La at the equator point Pa and a ground-contact length Ld at the ground-contact edge point Pd to a range of more than 1.0 but not more than 1.20. If the ratio La/Ld exceeds 1.20, the ground-contact length Ld at the ground-contact edge point Pd becomes excessively short as compared with the ground-contact length La at the equator point Pa, and thereby slip is prone to be generated at the tread ground-contact end E irrespective of the value of the angle β.

From a view of the orbital wear, it is preferable that the ground-contact length L of the ground-contact surface shape 10 is gradually reduced axially outward of the tire, i.e., the tangent X at each point of the profile line F is inclined toward +side as in the first invention.

Figure 9:
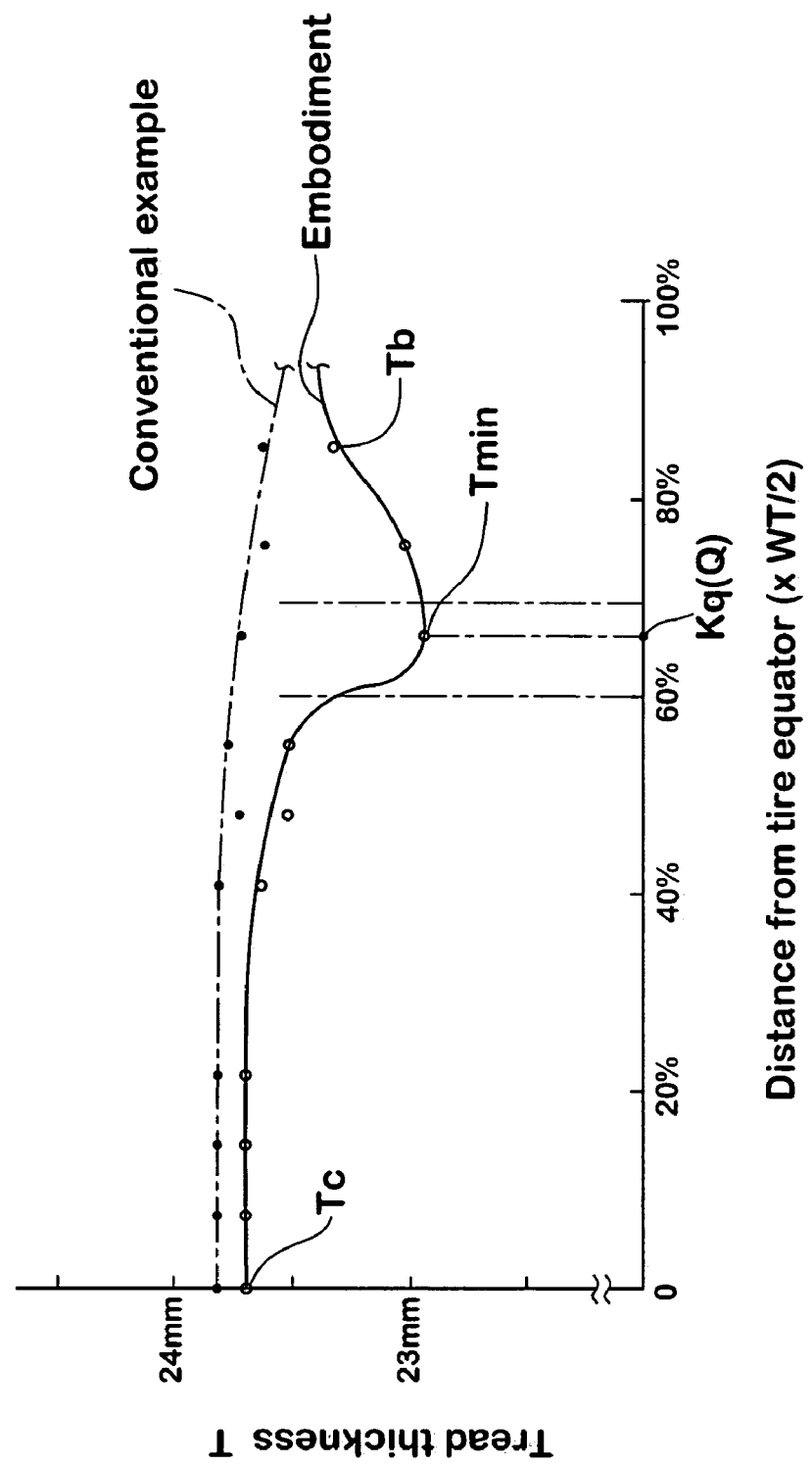
FIG. 9 is a diagram showing one example of distribution state of a tread thickness.

Next, in order to obtain the ground-contact surface shape 10 of the, second invention, as shown in FIGS. 6 and 9 in this example, a tread thickness smallest position Q where the tread thickness T between the tread profile line S and the second belt ply 7B becomes minimum value Tmin is provided in a region Z which is separated away from the tire equator C by a distance in a range of not less than 0.60 times but not more than 0.7 times the half of the ground-contact width of the tread. That is, a distance Kq from the tire equator C to the tread thickness smallest position Q is 0.60 to 0.7 times the half of the ground-contact width of the tread WT/2.

At that time, the tread thickness T is increased from the tread thickness smallest position Q axially outward of the tire to a position of the outer end of the second belt ply 7B. Similarly, the tread thickness T is increased to the tire equator C also axially inward of the tire from the tread thickness smallest position Q. Although the tread thickness. Tc at the tire equator C is great as compared with the tread thickness Tb of the second belt ply 7B at its outer end, the tread thickness Tc may be equal to or smaller than Tb.

By employing the distribution of the tread thickness T, it is possible to obtain the ground-contact surface shape 10 of the second invention.

In this example, in order to obtain the distribution of the tread thickness T, as shown in FIG. 6, the second belt ply 7B is formed of a single arc whose center is on the tire equator C. The tread profile line S in the tread center portion Yc is formed of the projecting arc profile line S1 using a single or a plurality of arcs, and the tread profile line S in the tread shoulder portion Ys is formed of the substantially straight profile line S2.

Next, a heavy duty tire 1 of a third invention will be explained.

Figure 10:
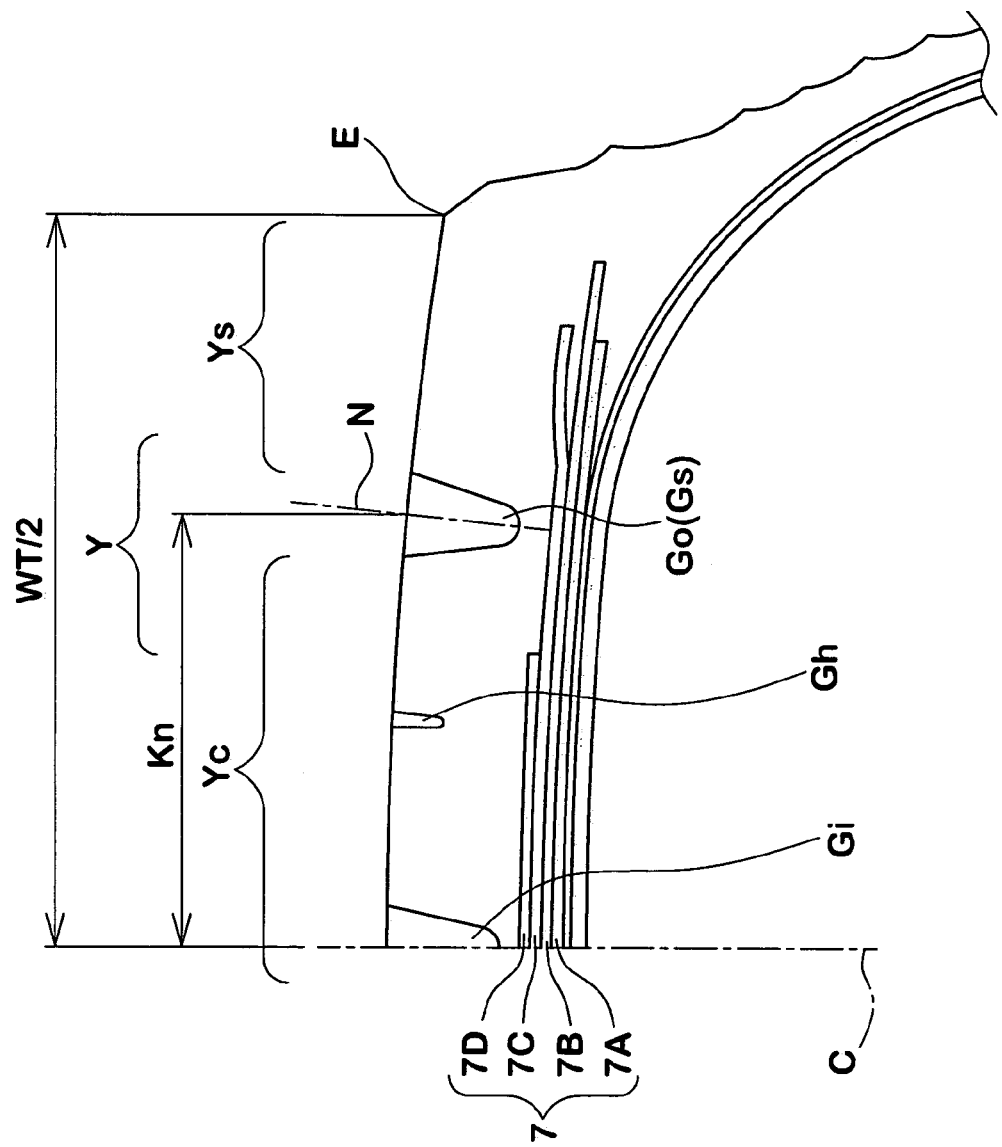
FIG. 10 is a sectional view enlargedly showing a tread portion of a tire according to a third invention.

The third invention can suitably be applied to a general heavy duty tire and a tire having three longitudinal main grooves G. In this example, as shown in FIG. 10, the heavy duty tire 1 comprises three grooves, i.e., an inner longitudinal main groove Gi disposed on the tire equator C, and outer longitudinal main grooves Go disposed on each side of the longitudinal main groove Gi. The longitudinal main groove Go constitutes the axially outermost shoulder groove Gs. Although a longitudinal thin groove Gh having a width narrower than the longitudinal main groove G is formed between the inner and outer longitudinal main grooves Gi and Go is formed in this example, this longitudinal thin groove Gh may not be formed.

Figure 11:
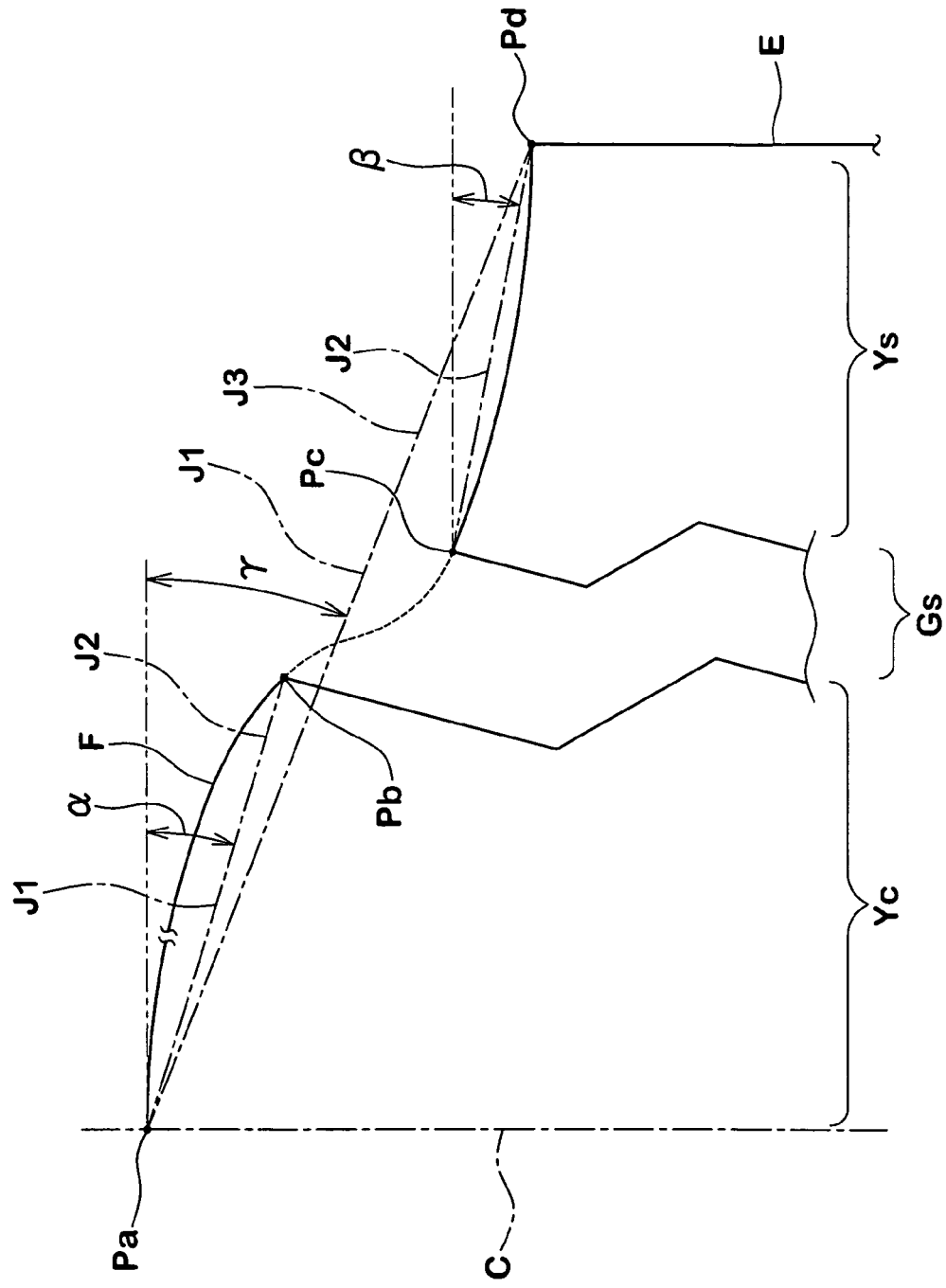
FIG. 11 is a diagram exaggeratedly showing the profile line of the ground-contact surface shape thereof.

According to the heavy duty tire 1 of the third invention, in order to suppress the uneven wear and equalize the wear, in the profile line F of the ground-contact surface shape 10 as shown in FIG. 11, 5) an angle α formed between the axial direction of the tire and a straight line J1 passing through the equator point Pa and a groove-side edge point Pb on the tire equator C side of the shoulder groove Gs is set in a range of more than 0° but not more than 15°;

6) an angle β formed between the axial direction of the tire and a straight line J2 passing through a groove-side edge point Pc on the tread ground-contact end E side of the shoulder groove Gs and the ground-contact edge point Pd is set in a range of not less than −5° but not more than the angle α; and 7) an angle γ formed between the axial direction of the tire and a straight line J3 passing through the equator point Pa and the ground-contact edge point Pd is set in a range of more than 0° but not more than 12°. As shown if FIG. 11, the groove-side edge point Pc is located inside the line J3, and the groove-side edge point Pb is located outside the line j3.

That is, if the angle γ exceeds 12°, the ground-contact pressure of the tread shoulder portion Ys is lowered and a load in the tread center portion Yc is excessively increased. Therefore, wear in the tread center portion Yc proceeds faster than the tread shoulder portion Ys, and center wear proceeds. If the angle γ is lower than 0°, the ground-contact pressure of the tread shoulder portion Ys is increased as compared with the tread center portion Yc. As a result, heat generation in the tread shoulder portion Ys during running is increased, and there is a tendency that peel-off damage is caused in the belt end by this temperature rise. Therefore, the angle γ is preferably in a range of 5 to 12° and more preferably in a range of 8 to 11°.

At that time, in order to reduce the slip near the groove-side edge point Pb and to suppress the orbital wear near the groove-side edge point Pb, the angle α is set in a range of more than 0° but not more than 15°. If the angle α exceeds 15°, the ground-contact pressure near the groove-side edge point Pb becomes excessively small as compared with the ground-contact pressure near the groove-side edge point Pc, slip near the groove-side edge point Pb becomes great, and orbital wear is prone to be generated. If the angle α is not more than 0°, the ground-contact pressure at the tread center portion Yc becomes extremely great and the center wear is prone to be generated. Therefore, the angle α is preferably set in a range of 50 to 12° and more preferably in a range of 8 to 11°.

In order to suppress the orbital wear near the groove-side edge point Pc and the unbalanced wear near the ground-contact edge point Pd, the angle β is set in a range of not less than −5° but not more than the angle α. If the angle β is smaller than −5°, the ground-contact pressure near the groove-side edge point Pc is prone to be reduced, and orbital wear is generated near the groove-side edge point Pc at an early stage. If the angle β exceeds the angle α, the ground-contact length Ld at the ground-contact edge point Pd becomes excessively small as compared with the ground-contact length Lb and Lc at the groove-side edge point Pb and the groove-side edge point Pc, respectively, and the unbalanced wear is prone to be generated. If the angle β becomes greater than the angle γ, the ground-contact length Ld at the ground-contact edge point Pd becomes excessively small with respect to the ground-contact length Lc at the groove-side edge point Pc, and the unbalanced wear is prone to be generated likewise. Therefore, it is preferable that the angle β is not less than 0°.

In the third invention, even if the angles α and β are out of the above ranges for the second invention, if the angle α is 12° to 15° and the angle β is −5° to −3°, it-is possible to exhibit the suppressing effect of the uneven wear like the second invention by controlling the angle γ in a range of more than 0° but not more than 12°.

The ground-contact surface shape 10 of the third invention may be obtained by a method which defines the thickness of the tread rubber, a method which defines the radius of curvature of the tread surface, a method which defines the radius of curvature of the belt layer, for example, or a method comprising a combination of these methods.

In the third invention, like the first and second inventions, it is preferable to gradually reduce the ground-contact length L toward the outside in the axial direction of the tire, and it is preferable to set the ratio La/Ld of the ground-contact length La at the equator point Pa and the ground-contact length Ld at the ground-contact edge point Pd in a range of more than 1.0 but not more than 1.20.

It is preferable that features 1) and 2) of the profile line F of the tire of the first invention are added to the heavy duty tire of the second invention, and that features 1) and 2) of the profile line F of the tire of the first invention are added to the heavy duty tire of the third invention.

Although the preferred embodiments of the present invention were described above, the invention is not limited to the illustrated embodiments, and can be carried out in various modes.

EMBODIMENT A

The heavy duty tires (tire size is 11R22.5) of the first invention having the internal structure shown in FIG. 1 were prototyped based on specs shown in Table 1, and wear of the prototyped tires was tested. A result of the test is shown in Table 1.

(1) Wear;

Test tires were mounted on rims (22.5×7.50) and internal pressure (800 kPa) was charged into the tires, and then the tires were attached to front wheels of a truck (2-2·D type). The truck was allowed to run through a distance of 10,000 km. In the tires after running, (a) A wear amount Zi in the inner longitudinal main groove Gi and a wear amount Zo in the longitudinal main groove Go (shoulder groove Gs) were measured, and ratios Zi/Zo were compared with each other. When the ratio Zi/Zo is greater than 1.0, center wear tends to be generated, when the ratio Zi/Zo is smaller than 1.0, shoulder wear tends to be generated, and as the ratio Zi/Zo becomes closer to 1.0, equalization of wear becomes more excellent. The wear amount Zi was an average value of both the groove side edges of the inner longitudinal main groove Gi, and the wear amount Zo was an average value of both the groove side edges of the outer longitudinal main groove Go.

Figure 12:
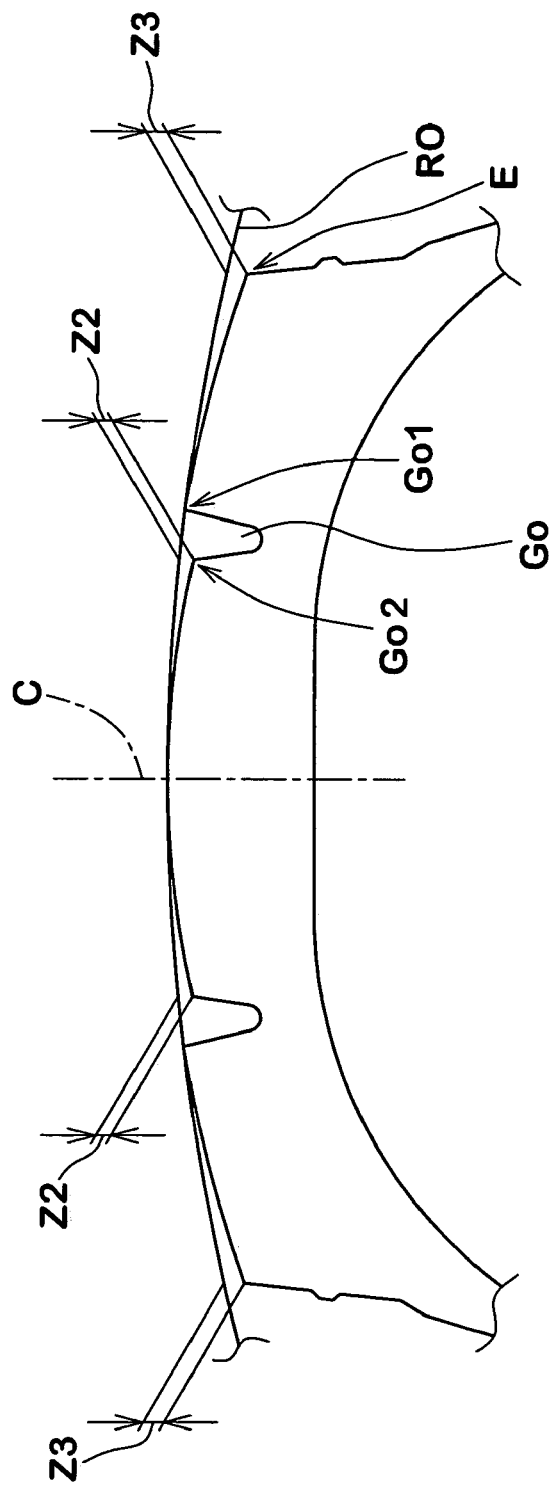
FIG. 12 is a diagram for explaining an evaluation method of orbital wear and unbalanced wear whose test results are shown in Table 1.
Figure 13:
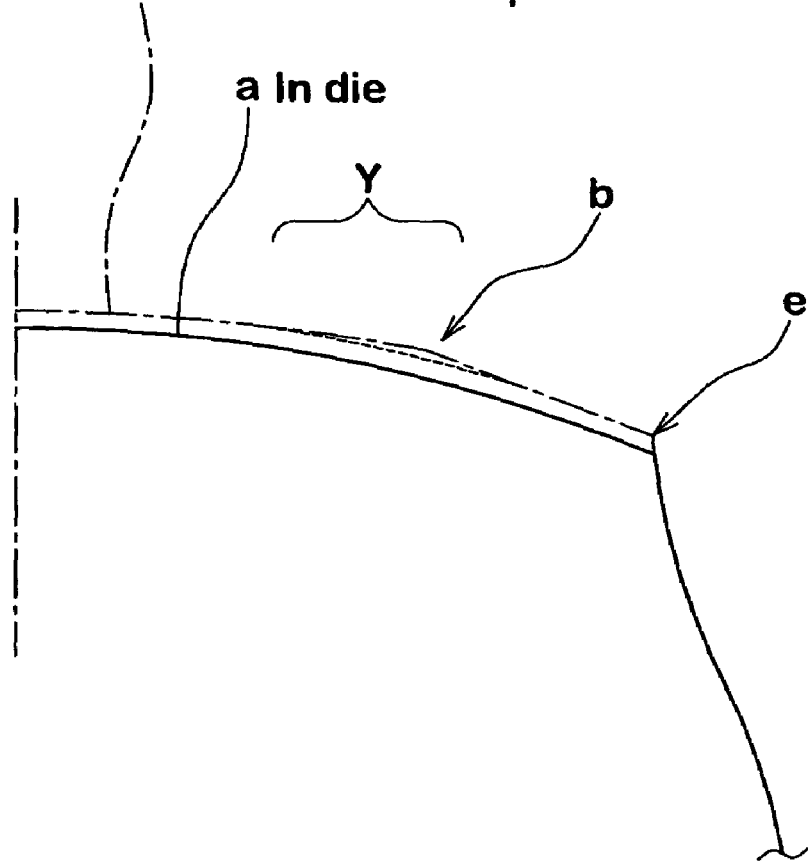
FIG. 13 is a diagram showing a tread profile shape of a conventional tire.

(b) As shown in FIG. 12, drop amounts Z2 of tire equator-side side edge Go2 of the outer longitudinal main groove Go with respect to a reference arc R0 passing through three points, i.e., the tire equator C and the groove-side edges Go1 and Go1 were measured and compared with each other. The greater the value, the greater the orbital wear is. Drop amounts Z3 of the tread ground-contact edge E with respect to the reference arc R0 were measured and compared with each other. The greater the value, the greater the unbalanced wear is.

| | Embodiment A1 | Embodiment A2 | Embodiment A3 | Comparative example A1 |
|---|---|---|---|---|
| Tread ground-contact width WT (mm) | 225 | 225 | 225 | 201 |
| Width WB of second ply (mm) | 200 | 200 | 200 | 192 |
| Radius of curvature of second play (mm) | 580 | 580 | 580 | 580 |
| Tangent angle (°) | | | | |
| $\theta 1$ | 7.0 | 9.5 | 3.0 | 36.5 |
| $\theta 2$ | 3.5 | 7.0 | 10.0 | 4.0 |
| $\theta 3$ | 6.0 | 10.0 | 4.5 | 27.5 |
| Difference ($\theta 3 - \theta 2$) | 2.5 | 3.0 | −5.5 | 23.5 |
| $\theta$max | 18.0 | 16.5 | 30.0 | 36.5 |
| Tread thickness T (mm) | | | | |
| Ty(*1) | 25.3 | 24.5 | 21.3 | 26.5 |
| Tc | 25 | 25 | 25 | 25 |
| Tb | 25.4 | 24.8 | 25.5 | 27.0 |
| (Ratio Ty/Tc) | 1.012 | 0.98 | 0.852 | 1.06 |
| (Ratio Tb/Tc) | 1.016 | 0.992 | 1.02 | 1.08 |
| Wear | | | | |
| Z2 (orbital wear) <mm> | 0.0 | 0.0 | 1.0 | 1.5 |
| Z3 (Unbalanced wear) <mm> | 1.0 | 2.0 | 1.1 | 5.0 |
| Ratio Zi/Zo (uniformity) | 1.15 | 1.23 | 1.45 | 0.92 |

*1 Tread thickness Ty was measured at a position away from the tire equator by a distance of 0.6 times the half of the ground-contact width of the tread WT/2.
(Others): A width of the shoulder groove is 12 mm, a distance Kn of the groove center line is 0.54 times the half of the tread ground-contact width: WT/2.

EMBODIMENT B

The heavy duty tires (tire size is 275/80R22.5) of the second invention having the internal structure shown in FIG. 1 were prototyped based on specs shown in Table 2, and wear of the prototyped tires was tested. A result of the test is shown in Table 2.

(1) Wear;

Test tires were mounted on rims (22.5×7.50), and internal pressure (875 kPa) was charged into the tires, and then the tires were attached to front wheels of a truck (2-2·D type). The truck was allowed to run through a distance of 60,000 km. In the tires after running, (a) Like the above embodiment A, the wear amount Zi in the inner longitudinal main groove Gi and the wear amount Zo in the outer longitudinal main groove Go (shoulder groove Gs) were measured, and the ratios Zi/Zo were compared with each other.

(b) Generation of unbalanced wear in the tread ground-contact edge E and orbital wear in the shoulder groove Go were visually checked.

prototyped based on specs shown in Table 1, and wear of the prototyped tires was tested. A result of the test is shown in Table 3.

(1) Wear;

Test tires were mounted on rims (22.5×7.50), and internal pressure (700 kPa) was charged into the tires, and then the tires were mounted to front wheels of a truck (2-2·D type). The truck was allowed to run through a distance of 60,000 km. In the tires after running, like the above embodiment B, (a) The wear amount Zi in the inner longitudinal main groove Gi and the wear amount Zo in the outer longitudinal main groove Go (shoulder groove Gs) were measured, and the ratios Zi/Zo were compared with each other.

TABLE 2

|  | Embodiment B1 | Embodiment B2 | Embodiment B3 | Comparative example B1 | Comparative example B2 | Comparative example B3 |
|---|---|---|---|---|---|---|
| Angle α (°) | 6 | 10 | 6 | 14 | 10 | 15 |
| Angle β (°) | 4 | 10 | 0 | 4 | −5 | 24 |
| Tread thickness T (mm) |  |  |  |  |  |  |
| Tmin(*1) | 23.3 | 23.8 | 22.7 | 23.8 | 23.8 | 24.1 |
| Tc<mm> | 24.3 | 24.5 | 24.2 | 24.3 | 24.5 | 24.1 |
| Tb<mm> | 24.3 | 24.7 | 24.7 | 25 | 25.7 | 23.9 |
| (Ratio Tmin/Tc) | 0.96 | 0.97 | 0.94 | 0.98 | 0.97 | 1.00 |
| (Ratio Tb/Tc) | 1.00 | 1.01 | 1.02 | 1.03 | 1.05 | 0.99 |
| Ground-contact length ratio La/Ld | 1.14 | 1.12 | 1.12 | 1.19 | 1.10 | 1.26 |
| Wear |  |  |  |  |  |  |
| Orbital wear | None | None | None | None | None | Generated |
| Unbalanced wear | None | None | None | None | Generated at the groove-side edge point Pc | None |
| Wear amount Zi (mm) | 4.7 | 4.6 | 4.7 | 5.4 | 5.2 | 5.6 |
| Wear amount Zo (mm) | 4.8 | 5.0 | 5.1 | 4.2 | 4.4 | 4.2 |
| (Ratio Zi/Zo) | 0.98 | 0.92 | 0.92 | 1.29 | 1.18 | 1.33 |

*1 Distance Kq at the minimum position Q of tread thickness is 0.65 times the half of the tread ground-contact width: WT/2.

EMBODIMENT C

The heavy duty tires (tire size is 11R22.5) of the third invention having the internal structure shown in FIG. 1 were (b) Generation of unbalanced wear in the tread ground-contact edge E and orbital wear in the shoulder groove Go were visually checked.

TABLE 3

|  | Embodiment C1 | Embodiment C2 | Embodiment C3 | Comparative example C1 | Comparative example C2 | Comparative example C3 |
|---|---|---|---|---|---|---|
| Radius of curvature of second ply | 550 | 550 | 550 | 550 | 550 | 550 |
| Angle α (°) | 13 | 6 | 8 | 16 | 10 | 8 |
| Angle β (°) | 6 | 5 | 0 | 26 | 13 | 15 |
| Angle γ (°) | 10 | 10 | 8 | 16 | 13 | 12 |
| Tread thick ratio |  |  |  |  |  |  |
| (Ratio Ty/Tc) (*1) | 1.04 | 0.97 | 0.97 | 0.96 | 1.07 | 1.01 |
| (Ratio Tb/Tc) | 1.10 | 1.00 | 1.02 | 0.96 | 1.09 | 1.02 |

TABLE 3-continued

|  | Embodiment C1 | Embodiment C2 | Embodiment C3 | Comparative example C1 | Comparative example C2 | Comparative example C3 |
| --- | --- | --- | --- | --- | --- | --- |
| Were | | | | | | |
| Orbital wear | None | None | None | Generated | None | Generated |
| Unbalanced wear | Slightly generated at the groove-side edge point Pb | None | None | Generated at the groove-side edge point Pb | None | None |
| Wear amount Zi [mm] | 4.8 | 4.9 | 4.6 | 5.6 | 5.5 | 5.8 |
| Wear amount Zo [mm] | 5.0 | 4.8 | 4.9 | 4.2 | 4.4 | 5.0 |
| (Ratio Zi/Zo) | 0.96 | 1.02 | 0.94 | 1.33 | 1.25 | 1.16 |

*1 Tread thickness Ty was measured at a position away from the tire equator C by a distance of 0.65 times the half of the tread ground-contact width: WT/2.

As shown in Tables 1 to 3, the tires of the embodiments of the first to third inventions of the application, the profile line of the ground-contact surface shape is limited by its tangent angle $\theta$, angles $\alpha$, $\beta$ or $\gamma$. Therefore, it is possible to effectively suppress uneven wear, such as unbalanced wear, orbital wear and center wear, and to achieve a high level of equalization of the wear.

INDUSTRIAL APPLICABILITY

As described above, in the heavy duty tire of the present invention, since the profile line of the ground-contact surface shape is limited by tangent angle $\theta$ and the like in each point of the profile line, it is possible to effectively suppress uneven wear, such as unbalanced wear, orbital wear and center wear, and to achieve a high level of equalization of the wear.

The invention claimed is:

1. A heavy duty tire comprising a carcass extending from a tread portion to a bead core of a bead portion through a sidewall portion, and a belt layer disposed inside the tread portion and outside the carcass, the tread portion having two or more longitudinal main grooves extending continuously in a circumferential direction of the tire, wherein a shoulder groove of the longitudinal main grooves disposed at an outermost side in an axial direction of the tire has a groove center line passing through a region Y having (1) an inner boundary separated from a tire equator C by a distance of 0.4 times a half of the ground-contact width of the tread and (2) an outer boundary separated from the tire equator C by a distance of 0.7 times a half of the ground-contact width of the tread, in the profile line of the ground-contact surface shape when a normal load is applied to a tire in a normal internal pressure state in which the tire is mounted on the regular rim and a normal internal pressure is charged into the tire, an angle $\alpha$ formed between the axial direction of the tire and a straight line J1 which passes through an equator point Pa on the tire equator and a groove-side edge point Pb on the tire equator side of the shoulder groove is set in a range of 5° to 12°, and an angle $\beta$ formed by the axial direction of the tire and a straight line J2 which passes through a groove-side edge point Pc on the tread ground-contact edge side of the shoulder groove and a ground-contact edge point Pd on a tread ground-contact edge is set in a range of not less than −3° but not more than the angle $\alpha$, and the groove-side edge point Pc is located inside a straight line J3 between the equator point Pa and the ground-contact edge point Pd, and the groove-side edge point Pb is located outside the line J3, and a tangent angle $\theta$ of a tangent X to the profile line with respect to the axial direction of the tire has a maximum value $\theta$max in the region Y.

2. A heavy duty tire according to claim 1, wherein in the ground-contact surface shape, a ratio La/Ld of a circumferential direction ground-contact length La at the equator point Pa and a ground-contact length Ld at the ground-contact edge point Pd is set in a range of more than 1.0 but not more than 1.20.

3. A heavy duty tire according to claim 1 or 2, wherein the belt layer includes a first belt ply on the carcass side and a second belt ply disposed outside the first belt ply, when a tread thickness between a profile line of a tread surface and the second belt ply is defined as T, a tread thickness smallest position where the tread thickness T becomes a minimum value Tmin is located in a region Z which is separated away from the tire equator C by a distance in a range of not less than 0.60 times but not more than 0.7 times a half of the ground-contact width of the tread, and the tread thickness T is increased from the tread thickness smallest position to a position of an outer end of the second belt ply.

4. A heavy duty tire according to claim 1, wherein the angle $\alpha$ is from 6 to 12°.

5. A heavy duty tire comprising a carcass extending from a tread portion to a bead core of a bead portion through a sidewall portion, and a belt layer disposed inside the tread portion and outside the carcass, the tread portion having two or more longitudinal main grooves extending continuously in a circumferential direction of the tire, wherein a shoulder groove of the longitudinal main grooves disposed at an outermost side in an axial direction of the tire has a groove center line passing through a region Y having (1) an inner boundary separated from a tire equator C by a distance of 0.4 times a half of the ground-contact width of the tread and (2) an outer boundary separated from the tire equator C by a distance of 0.7 times a half of the ground-contact width of the tread, in the profile line of the ground-contact surface shape when a normal load is applied to a tire in a normal internal pressure state in which the tire is mounted on the regular rim and a normal internal pressure is charged into the tire, an angle $\alpha$ formed between the axial direction of the tire and a straight line J1 which passes through an equator point Pa on the tire equator and a groove-side edge point Pb on the tire equator side of the shoulder groove is set in a range of 5° to 15°, an angle β formed by the axial direction of the tire and a straight line J2 which passes through a groove-side edge point Pc on the tread ground-contact edge side of the shoulder groove and a ground-contact edge point Pd on a tread ground-contact edge is set in a range of not less than −5° but not more than the angle α, and an angle γ formed between the axial direction of the tire and a straight line J3 which passes through the equator point Pa and the ground-contact end point Pd is set in a range of more than 0° but not more than 12° and not less than the angle β, and the groove-side edge point Pc is located inside the line J3 and the groove-side edge point Pb is located outside the line J3, and a tangent angle θ of a tangent X to the profile line with respect to the axial direction of the tire has a maximum value θmax in the region Y.

6. A heavy duty tire according to claim 5, wherein the angle α is from 6° to 15°.

7. A heavy duty tire according to claim 5, wherein the angle γ is from 5° to 12°.

* * * * *